(12) United States Patent
Saegusa (10) Patent No.: US 7,542,130 B2
(45) Date of Patent: Jun. 2, 2009

(54) MOVING BODY MEASURING APPARATUS

(75) Inventor: Hiroshi Saegusa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 47 days.

(21) Appl. No.: 11/073,761

(22) Filed: Mar. 8, 2005

(65) Prior Publication Data
US 2005/0213076 A1   Sep. 29, 2005

(30) Foreign Application Priority Data
Mar. 9, 2004   (JP)   ............... 2004-065486

(51) Int. Cl.
*G01P 3/36*   (2006.01)
(52) U.S. Cl. ...................... 356/28; 356/28.5
(58) Field of Classification Search ............ 356/28, 356/28.5
See application file for complete search history.

(56) References Cited

U.S. PATENT DOCUMENTS

| | | | | |
|---|---|---|---|---|
| 4,470,696 | A * | 9/1984 | Ballard | 356/28.5 |
| 4,709,580 | A * | 12/1987 | Butts et al. | 73/178 R |
| 5,491,642 | A * | 2/1996 | Wormell et al. | 702/49 |
| 5,579,103 | A * | 11/1996 | Tachikawa | 356/5.1 |
| 5,642,194 | A * | 6/1997 | Erskine | 356/497 |
| 6,034,761 | A * | 3/2000 | Takamiya | 356/28.5 |
| 6,517,236 | B2 * | 2/2003 | Sun et al. | 374/4 |
| 6,754,370 | B1 * | 6/2004 | Hall-Holt et al. | 382/106 |
| 2001/0009458 | A1 * | 7/2001 | Asaka et al. | 356/28.5 |
| 2002/0027656 | A1 * | 3/2002 | Chavanne | 356/338 |
| 2002/0145727 | A1 * | 10/2002 | Wang | 356/28 |
| 2002/0173367 | A1 * | 11/2002 | Gobush et al. | 473/197 |
| 2004/0118624 | A1 * | 6/2004 | Beuhler et al. | 180/167 |

FOREIGN PATENT DOCUMENTS

| | | |
|---|---|---|
| JP | 8-304020 | 11/1996 |
| JP | 2001-242417 | 9/2001 |
| JP | 2003-057258 | 6/2003 |
| JP | 3098202 | 9/2003 |
| WO | WO 00/17804 | 3/2000 |

* cited by examiner

*Primary Examiner*—Thomas H Tarcza
*Assistant Examiner*—Timothy A Brainard
(74) *Attorney, Agent, or Firm*—Finnegan, Henderson, Farabow, Garrett & Dunner, L.L.P.

(57) ABSTRACT

An apparatus has an optical member having a boundary surface on which light is incident, the optical member being adapted to transmit light entering the boundary surface from one side and to reflect light entering the boundary surface from the other side; a light source that emits light toward the optical member and irradiates light outgoing from the optical member onto a moving body; a camera that photographs via the optical member an image of light reflected from a reflection marker provided on a surface of the moving body; and a computation portion that computes movement information for the moving body based on the image of the light reflected by the reflection marker and photographed by the camera. An outgoing angle of the light outgoing from the boundary surface substantially coincides with an incoming angle at which the light reflected by the reflection marker enters the boundary surface.

10 Claims, 7 Drawing Sheets

MOVING BODY

FIG.6B

MARKER REFLECTED LIGHT 2

MARKER REFLECTED LIGHT 1

MOVING BODY MEASURING APPARATUS

BACKGROUND OF THE INVENTION

The present invention relates to a moving body measuring apparatus that measures movement information of a moving body, such as the movement velocity, the movement direction, and the orientation of a golf club head immediately prior to a golf club striking a golf ball during a golf swing, and the initial velocity, movement direction, and spin rate of a golf ball immediately after being struck by the golf club.

Methods and apparatuses for finding movement information, such as movement velocity and rotation amount by providing a plurality of cameras along a path of a moving body, and photographing the moving body to measure the movement thereof (motion and behavior) have been heretofore proposed.

For example, JP 8-304020 A discloses a moving body movement-accuracy measuring apparatus that measures the amount of movement and the direction of movement of a moving body simultaneously, and performs evaluation of angular deviations of the moving body with little influence of errors in initial settings.

Further, JP 2002-525613 A discloses a method and an apparatus for measuring the flight path and the flight of a golf ball by using two cameras. With this method and apparatus, irradiation light is irradiated onto a reflective marker provided to a moving body that is an object to be measured, and light reflected by the reflective marker is photographed as an image. The irradiation light from an irradiation light source is reflected by using a total reflection mirror, and irradiated onto the reflective marker on a surface of the object to be measured. Holes are formed in the total reflection mirror in order to ensure the field of view for the two cameras. The cameras photograph the image through the total reflection mirror. In other words, the flight path and the flight of the golf ball are measured by making the optical axis of the irradiation light and the optical axis of the light reflected by the reflective marker approach each other. The velocity, direction, and bearing of a golf ball immediately after the golf ball is struck, and the flight path of the golf ball can be computed.

However, the movement direction of the object to be measured is substantially limited with the invention disclosed in JP 8-304020 A. Accordingly, it is necessary to install position detector elements over a wide region in order to measure the movement information of a moving body as it moves while rotating, for example, the movement information of a moving body such as the golf club head or a golf ball. The invention disclosed in JP 8-304020 A is thus not suited to measuring the movement information of the moving body accompanying rotation.

Further, although the optical path of the irradiation light irradiated onto the reflective marker approaches the line of sight axis of the camera with the invention disclosed by JP 2002-525613 A, they do not substantially overlap. In particular, the optical axis of the irradiation light irradiated onto the reflective marker and the line of sight axis of the camera are greatly separated when the moving body is relatively close to the measuring apparatus. Accordingly, the periphery of a center region that is a region of interest to be photographed by the camera is directly irradiated with the irradiation light and thus becomes bright. Since the center region itself is irradiated with indirect light from the irradiation light, the center region becomes darker compared to the periphery thereof. The light reflected by the reflective marker positioned in the region of interest thus cannot be photographed at high contrast, and it becomes necessary to perform complex image processing in order to correct the photographed image. Further, depending upon the circumstances, image processing may not be enough and the movement information of the moving body thus cannot be found.

SUMMARY OF THE INVENTION

An object of the present invention is to provide a moving object measuring apparatus that overcomes the above problems of the prior art and is capable of finding movement information (such as movement velocity, movement direction, and rotation rate) of a moving body, such as a golf club head or a golf ball that moves while accompanying a spin, with high precision.

In particular, extremely important information, that is, information on the position, orientation, and the like of an impact surface of a golf club head immediately before a golf ball is struck, can be accurately found when selecting a golf club head as the moving body.

According to the present invention, the irradiation light source, the camera, and the optical member are adjustably arranged so that the angle at which irradiation light outgoes from a boundary surface of the optical member substantially coincides with the angle at which light reflected by the reflection marker is incident upon the boundary surface of the optical member. Accordingly, light can be uniformly irradiated onto the reflection marker, and the reflection marker can be photographed with a high contrast, unlike conventional measuring apparatuses. Measurements of complex motion can therefore be performed at high precision by using a configuration that is simpler than configurations employed by conventional measuring apparatuses. In particular, extremely important information, namely information on the position, orientation, and the like of an impact surface of a golf club head immediately before a golf ball is struck can be accurately found when selecting a golf club head as the moving body.

The present invention provides a moving body measuring apparatus that measures movement information of a moving body as an object to be measured. The moving body measuring apparatus comprises: an optical member having a boundary surface on which light is incident, the optical member being adapted to transmit light entering the boundary surface from one side and to reflect light entering the boundary surface from the other side; an irradiation light source that emits light toward the optical member and irradiates light outgoing from the optical member onto the moving body; a camera that photographs via the optical member an image of light reflected from a reflection marker provided on a surface of the irradiated moving body; and a movement information computation portion that computes movement information for the moving body based on the image of the light reflected by the reflection marker and photographed by the camera, wherein arrangement of the irradiation light source, the camera, and the optical member is adjusted such that an outgoing angle of the irradiation light outgoing from the boundary surface substantially coincides with an incoming angle at which the light reflected by the reflection marker enters the boundary surface.

The moving body measuring apparatus preferably further comprises a light absorbing member provided in a transmission direction of the boundary surface as seen from the camera, wherein the camera is disposed so as to photograph the image of the light reflected by the reflection marker after the light is reflected by the boundary surface of the optical member.

Preferably, the optical member transmits and reflects portions of the irradiation light at the boundary surface such that the irradiation light outgoes from the boundary surface in two different directions, the irradiation light source irradiating the moving object from two different directions, and wherein outgoing angles at which the irradiation light outgoes from the boundary surface of the optical member in the two different directions substantially coincide with respective incoming angles at which two reflected light beams, obtained by irradiating the moving body in two different directions, enter the boundary surface.

The moving body measuring apparatus preferably further comprises reflecting mirrors disposed in optical paths followed by the two reflected light beams before arriving at the camera such that the number of reflections, including the reflection by the optical member, is an even number or an odd number for each of the two reflected light beams. Then, the camera may incorporate images of the two reflected light beams that pass through two different optical paths into one image frame.

The reflection marker is preferably a retroreflection marker that reflects the irradiation light toward an incoming direction of the irradiation light.

The camera of the moving body measuring apparatus preferably photographs an image of the moving reflection marker through multiple exposures at fixed intervals of time.

The camera may perform the multiple exposures at the fixed intervals of time by the irradiation light source emitting light intermittently at the fixed intervals of time during photography by the camera.

Alternatively, the camera may perform the multiple exposures at the fixed intervals of time by the irradiation light source emitting light continuously during photography by the camera.

The camera may be a high speed video camera that performs photography at a speed equal to or greater than 120 frames per second.

BRIEF DESCRIPTION OF THE DRAWINGS

In the accompanying drawings:

FIGS. 8A and 8B are schematic diagrams of image in which trajectories of retroreflection markers provided to a golf club as a moving body are photographed, of which FIG. 8A is an example of an image photographed using the head measuring apparatus as an embodiment of the present invention, and FIG. 8B is a diagram that shows an image photographed by employing a conventional method.

DETAILED DESCRIPTION OF THE PREFERRED EMBODIMENTS

A moving body measuring apparatus and a moving body measuring method of the present invention are explained in detail below based on preferred embodiments shown in the accompanying drawings.

Figure 1:
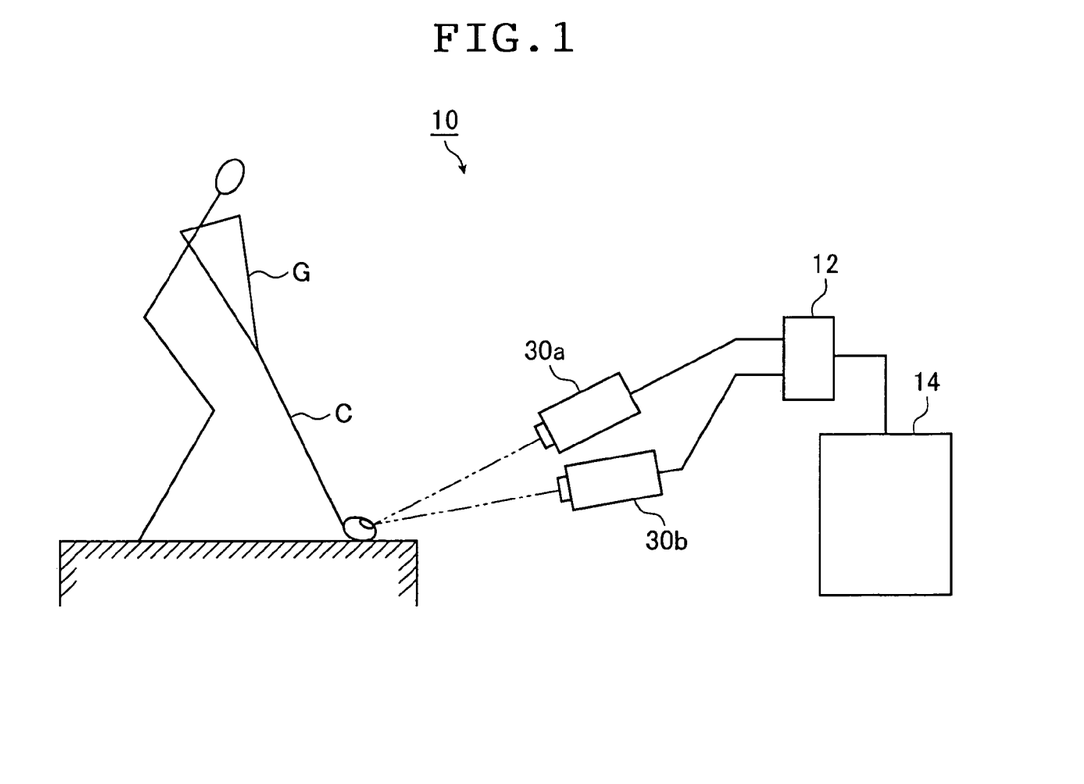
FIG. 1 is a schematic side view that shows an embodiment of a moving body measuring apparatus of the present invention.

FIG. 1 is a side view that schematically shows an embodiment of a moving body measuring apparatus of the present invention. A golf club head is used here as a moving body to be measured.

A moving body measuring apparatus (hereinafter called a head measuring apparatus) 10 shown in FIG. 1 is an apparatus that measures movement information of a golf club head before and after the golf club head strikes a golf ball when a golfer G grips a golf club C and swings the golf club C to strike the golf ball.

The head measuring apparatus 10 includes irradiation and photographing portions 30a and 30b that photograph a golf club head from two different directions and have substantially the same construction of optical devices such as cameras and irradiation light sources. The head measuring apparatus 10 further includes a control device 12 that controls the irradiation and photographing portions 30a and 30b, and a computer system 14, which is a movement information computation portion. The computer system 14 takes in image data photographed by the irradiation and photographing portions 30a and 30b and performs signal processing, image processing, and behavior analysis on the image data.

Three or more markers are provided on the golf club head of the golf club C in different positions so that the behavior of the golf club head can be measured. Retroreflection markers are used as the markers so that images photographed by the irradiation and photographing portions 30a and 30b can always be identified. The retroreflection markers reflect irradiation light in the direction in which it is irradiated. In other words, the retroreflection markers have a retroreflection function. A known retroreflection sheet may be cut into predetermined shapes, for example, and used as the retroreflection markers.

The retroreflection markers may be provided on at least one surface from among an upper end surface and side end surfaces of the golf club head contacting an impact surface that impacts a golf ball, for example. Further, the retroreflection markers may be provided on a hosel portion of the golf club head.

Figure 2A:
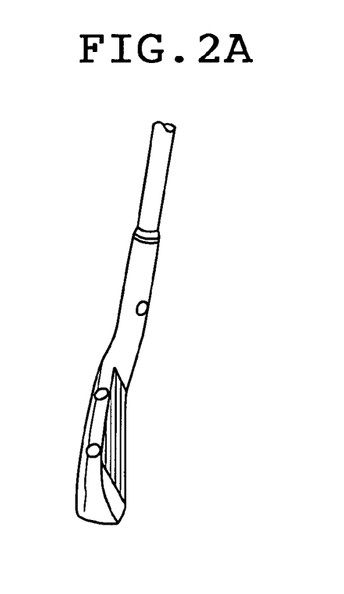
FIG. 2A is a diagram that explains an example of arrangement positions of retroreflection markers provided to an iron type golf club head.
Figure 2B:
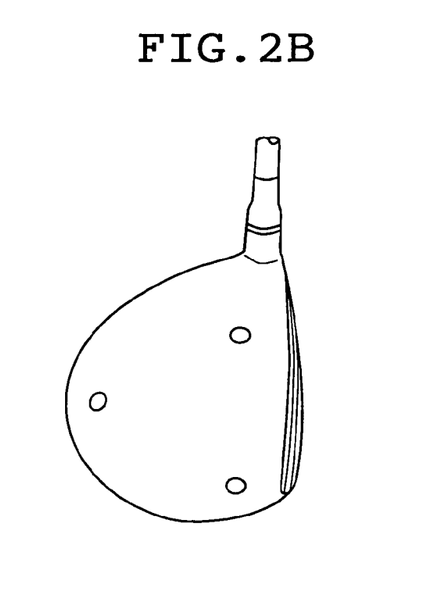
FIG. 2B is a diagram that explains an example of arrangement positions of retroreflection markers provided to a wood type golf club head.

FIGS. 2A and 2B are schematic diagrams that show an example of retroreflection markers provided on the golf club C. In the example shown in FIG. 2A, the retroreflection markers are provided on an upper end surface of an iron type golf club head, contacting an impact surface, and a hosel portion of the golf club head. In the example shown in FIG. 2B, the retroreflection markers are provided at three locations on an upper end surface of a golf club head of a wood type golf club which constitutes a crown portion connecting an impact surface.

The retroreflection markers are provided on the golf club head at three or more locations. The retroreflection markers are set in positions such that they form the apexes of a triangle and do not lie on one straight line. In the example of FIG. 2A, one of the retroreflection markers is provided on the hosel portion so that the three retroreflection markers are not placed on one straight line. In order to perform higher precision measurements, it is preferable to provide the retroreflection markers so that they form the apexes of an equilateral triangle, as shown in FIG. 2B.

Figure 3A:
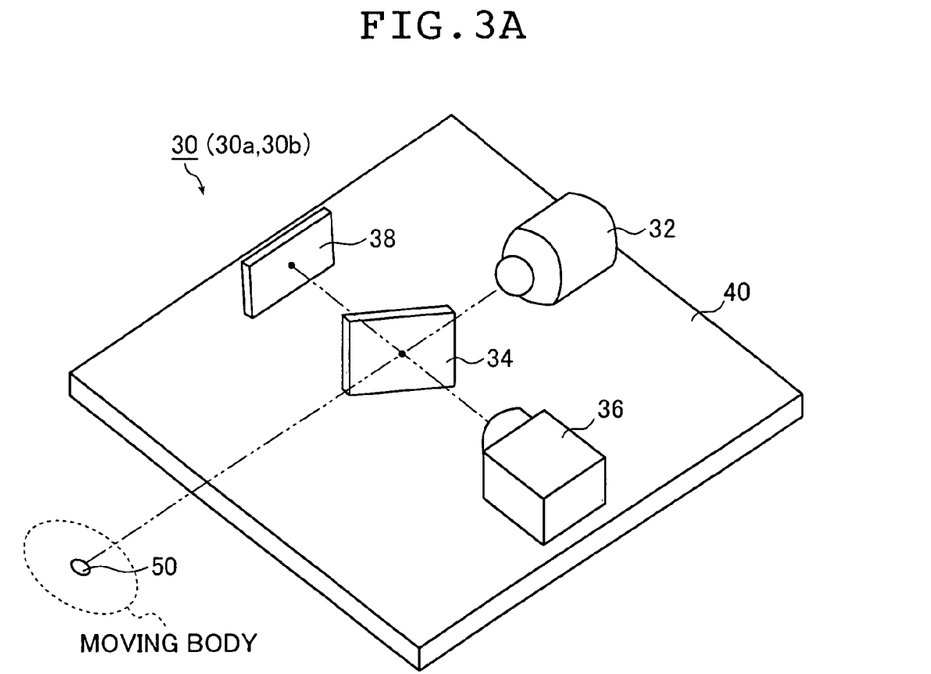
FIG. 3A is a diagram that shows an example of a configuration of an irradiation and photographing portion of the moving body measuring apparatus of FIG. 1.
Figure 3B:
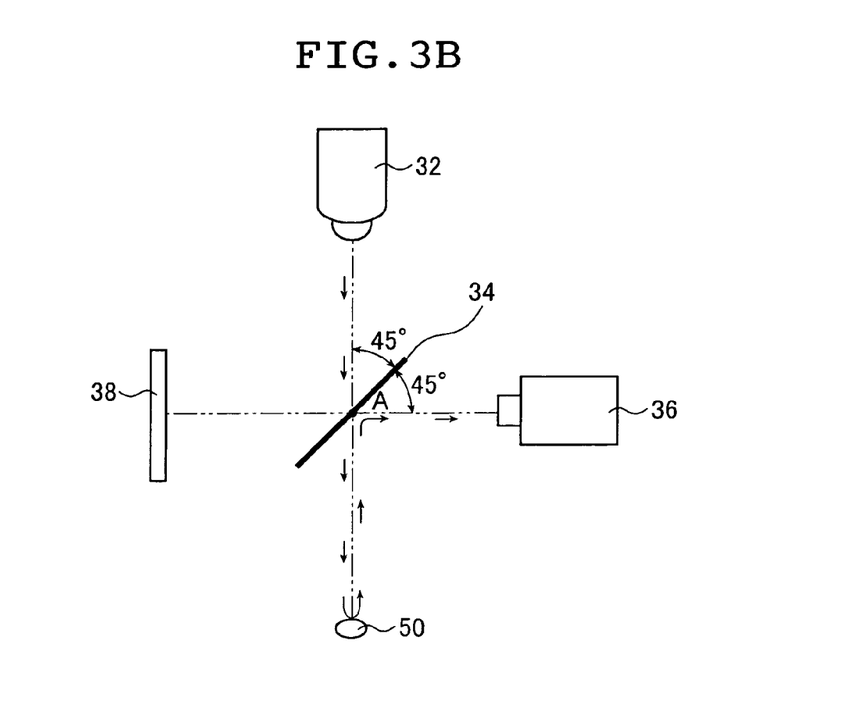
FIG. 3B is a diagram that explains an optical path formed by the irradiation and photographing portion.

FIG. 3A is a perspective view that shows a portion that constitutes one of the irradiation and photographing portions 30a and 30B (collectively referred to as the irradiation and photographing portion 30) of the head measuring apparatus 10. FIG. 3B is a perspective view of FIG. 3A.

Referring to FIGS. 3A and 3B, the irradiation and photographing portion 30 includes an irradiation light source 32 that irradiates a moving body to be measured, a flat plate half mirror 34 having a boundary surface from which light entering from one side outgoes (reflection and transmission), a camera 36, a light absorbing member 38 that absorbs light, and a flat plat surface 40 to which each of the components described above is attached.

The irradiation light source 32 is a halogen light source, and emits continuous light. The irradiation light source 32 is provided on the flat plate surface 40 and disposed so that light is irradiated onto retroreflection markers 50 on a moving body through the half mirror 34.

As described above, the half mirror 34 has a flat plate shape, and has the boundary surface from which light entering from one side outgoes (reflection and transmission). The half mirror 34 is disposed perpendicular with respect to the flat plate surface 40 here. The boundary surface is oriented such that the optical path of light emitted by the irradiation light source 32 becomes incident on the boundary surface of the half mirror 34 at an incoming angle of approximately 45°.

The camera 36 has a light receiving portion such as a lens, and performs photographing of an image entering the light receiving portion. The camera 36 is provided on the flat plate surface 40 so that a line of sight axis of the camera 36 faces toward a position at which light emitted to the half mirror 45 from the irradiation light source 32 is transmitted, and that an angle formed between the line of sight axis and the optical path of the irradiation light that transmits through the half mirror 34 to irradiate the moving object is approximately 90°.

The light absorbing member 38 is formed by a black color cloth, plate, or the like. The light absorbing member 38 is provided in an area within a field of view region of the camera, which lies on an extension of the line of sight axis of the camera 36 passing through the half mirror 34 as seen from the camera side.

The irradiation light source 32 emits continuous light toward the boundary surface of the half mirror 34. The continuous light emitted enters, and passes through, the boundary surface of the half mirror 34. The transmitted light outgoes from a position A on the boundary surface of the half mirror 34 toward the retroreflection markers 50 of the moving body. The retroreflection markers 50 have retroreflecting characteristics here. Light reflected by the retroreflection markers 50 is therefore reflected toward the boundary surface of the half mirror 34, and the reflected light enters the boundary surface of the half mirror 34 at the position A. At this point, an outgoing angle formed between the light from the irradiation light source 32 that transmits through and outgoes from the half mirror 34 and the boundary surface of the half mirror 34 substantially coincides with an incoming angle of the light reflected by the retroreflection markers 50.

Next, the reflected light is reflected toward the camera 36 by the boundary surface of the half mirror 34. In other words, a position at which the light emitted by the irradiation light source 32 transmits through and outgoes from the boundary surface of the half mirror 34 is substantially identical to a position at which the light reflected by the retroreflection markers 50 is reflected by the half mirror 34. Accordingly, the reflected light is reflected toward the camera 36 whose line of sight is oriented toward the position A. An image from the retroreflection markers 50 thus enters the light receiving portion such as a lens of the camera 36, and is photographed.

The light absorbing member 38 absorbs light that is reflected by the boundary surface of the half mirror 34 from among the light emitted by the irradiation light source 32. Photography by the camera of an image formed by light that is emitted by the irradiation light source 32, reflected by the boundary surface of the half mirror 34, reflected or scattered in a frame inner portion of the irradiation and photographing portion or the like, and then transmits through the boundary surface of the half mirror 34 can be prevented by the light absorbing member 38. Optical noise in the region being photographed by the camera 36 can therefore be removed, and the contrast of the photographed object formed by the light reflected from the retroreflection markers 50 can be increased.

It should be noted that, although a halogen light source is used as the irradiation light source 32, there are no particular limitations placed on the light source type. Other light sources can also be used, provided that they are light sources that irradiate continuous light during photography. Depending upon the intended use, mercury fluorescent lamps, xenon fluorescent lamps, LEDs, and the like can be selected. Further, light sources that emit light intermittently at fixed intervals during photography by the camera can also be used, such as strobe light sources. In this case the camera 36 can perform photography by making multiple exposures of the image formed by the light reflected by the retroreflection markers 50.

Further, a high speed video camera, a high speed shutter camera, or the like that photographs at least 120 frames per second is used as the camera 36 when measuring the moving body by photographing the retroreflection markers on the golf club head. In this case the camera 36 can perform photography by making at fixed intervals multiple exposures of the image formed by the light reflected by the retroreflection markers 50. Of course the speed of photography of the high speed video camera or the high speed shutter camera can be freely set according to the movement velocity or the like of the moving body to be measured. Further, an ordinary video camera or the like can also be used as the camera 36 depending upon the movement velocity of the moving body to be measured.

Further, a half prism can also be used as a substitute for the half mirror 34 in the irradiation and photographing portion 30. In this case a metallic coated surface of the half prism may be provided similar to the boundary surface of the half mirror 34. Furthermore, optical members other than half mirrors and half prisms can also be used, similar to the half mirror 34, provided that they are optical members having a boundary surface that transmits at least an image projected from one side and reflects at least an image projected from the other side.

In addition, there are no particular limitations placed on the locations and the orientations at which the irradiation and photographing portions 30*a* and 30*b* are disposed. The irradiation and photographing portions 30*a* and 30*b* can be freely disposed provided that the retroreflection markers can be photographed from two different directions prior to and after the golf club head strikes the golf ball, and in addition, provided that the retroreflection markers do not obstruct the golf swing in a predetermined location and do not obstruct the flight of the golf ball in a predetermined direction. The flat plate surface 40 of the irradiation and photographing portion 30 can of course be freely inclined according to its installation location and the directions in which irradiation and photography are performed.

Further, the irradiation and photographing portions 30*a* and 30*b* photograph the golf club head from two different directions prior to and after the golf ball is struck in this embodiment. The present invention is not limited to this method, however, and the golf club head may also be photographed from another number of different directions greater than two, such as three different direction, and four different directions.

The controller device 12 controls each of the cameras of the irradiation and photographing portions so that the irradiation and photographing portions 30*a* and 30*b* will take photographs continually at fixed intervals at the same time, and when necessary, controls the irradiation light source so as to illuminate in correspondence with the above control. Further, the controller device 12 converts an image signal obtained by the continuous photography by the irradiation and photographing portions 30*a* and 30*b* into digital image data through an A/D conversion process. The controller device 12 has a portion that stores the digital image data in a memory after darkness correction and the like is performed on the image data.

Figure 4:
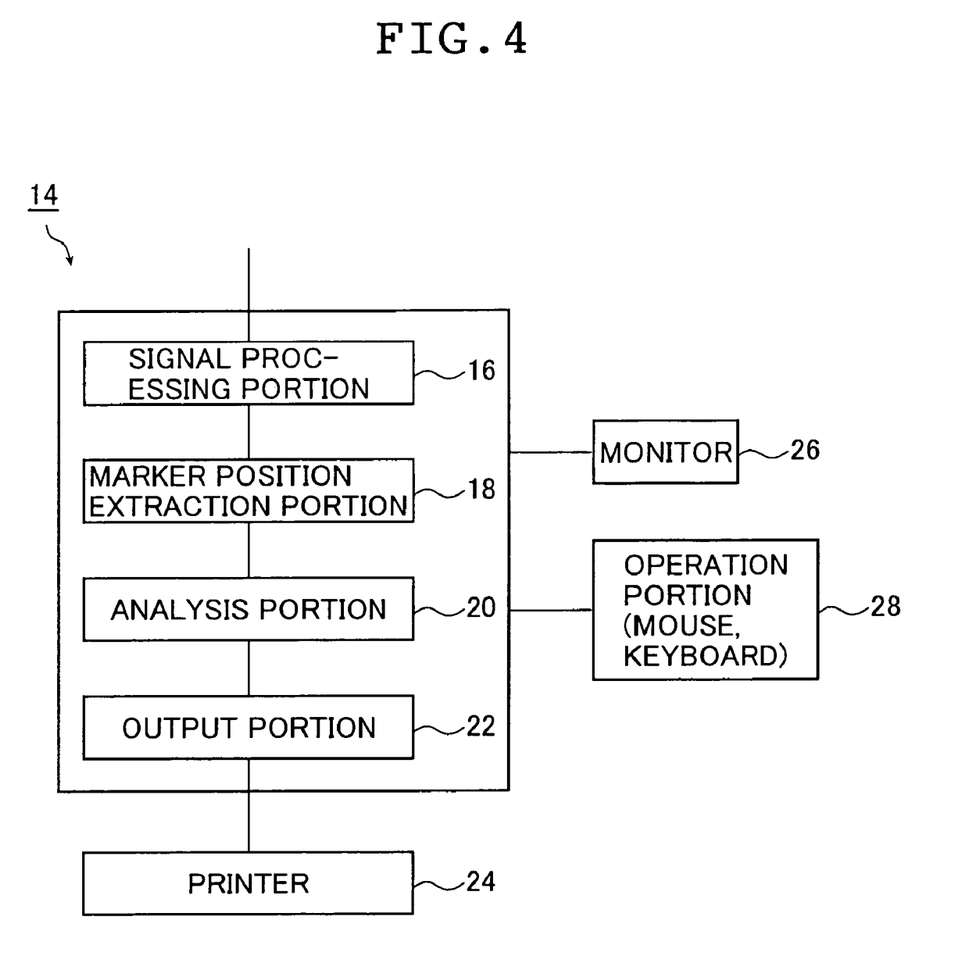
FIG. 4 is a block diagram that shows a configuration of the moving body measuring apparatus of FIG. 1.

FIG. 4 is a block diagram that shows processing performed by the computer system 14 used in the head measuring apparatus 10.

The computer system 14 identifies the positions of the retroreflection markers on the golf club head during the golf swing from the image data of the retroreflection markers. The computer system 14 then computes movement (motion and behavior) of the golf club head using the identified positions. In addition, the computer analyzes the golf swing and recommends a golf club suited to the golf swing.

Specifically, the computer system 14 includes a signal processing portion 16, a marker position extraction portion 18, an analysis portion 20, and an output portion 22. A monitor 26 and an operation portion 28 are connected to the computer system 14.

Although the signal processing portion 16, the marker position extraction portion 18, the analysis portion 20, and the output portion 22 function by executing a program on a CPU and memory, those portions may also be configured by using hardware such as circuits in the present invention.

The signal processing portion 16 performs brightness corrections and contrast corrections on the image data under predetermined processing conditions, and in addition, performs binarization, so that data values for the retroreflection marker portions can be distinguished from data values of other portions, for example, making it possible to identify the retroreflection markers within the image.

The marker position extraction portion 18 identifies the positions of the retroreflection markers from the image data for the golf club head during the golf swing, and computes the behavior of the golf club head using the identified positions. The marker position extraction portion 18 functions to extract three dimensional positions by identifying the retroreflection marker positions, and functions to compute time series data for the position and the orientation of the golf club head by using the extracted three dimensional positions.

In addition, the marker position extraction portion 18 identifies the retroreflection marker portions from the binarized image and extracts the positions thereof, and finds the position coordinates of the retroreflection markers within the images photographed from different directions at the same time by the irradiation and photographing portions 30*a* and 30*b*. Using the position coordinates obtained, the marker position extraction portion 18 finds position coordinates of the markers in a three dimensional coordinate system that defines a space through which the golf club head passes, and extracts the positions of the retroreflection markers in the three dimensional coordinates.

The positions and the photographing directions of the cameras 36 of the irradiation and photographing portions 30*a* and 30*b* are known in advance. Accordingly, the three dimensional coordinates in the predetermined three dimensional coordinate system that indicates the space through which the golf head passes can be found by finding the two dimensional position coordinates in the images photographed by the cameras 36.

When the retroreflection markers are photographed at time intervals of 0.001 seconds, for example, time series data for the three dimensional positional coordinates in which the retroreflection markers exist can be found every 0.001 seconds. The retroreflection markers are provided in three locations on the golf club head, and the three dimensional position coordinates of the three retroreflection markers can of course be found.

Figure 5A:
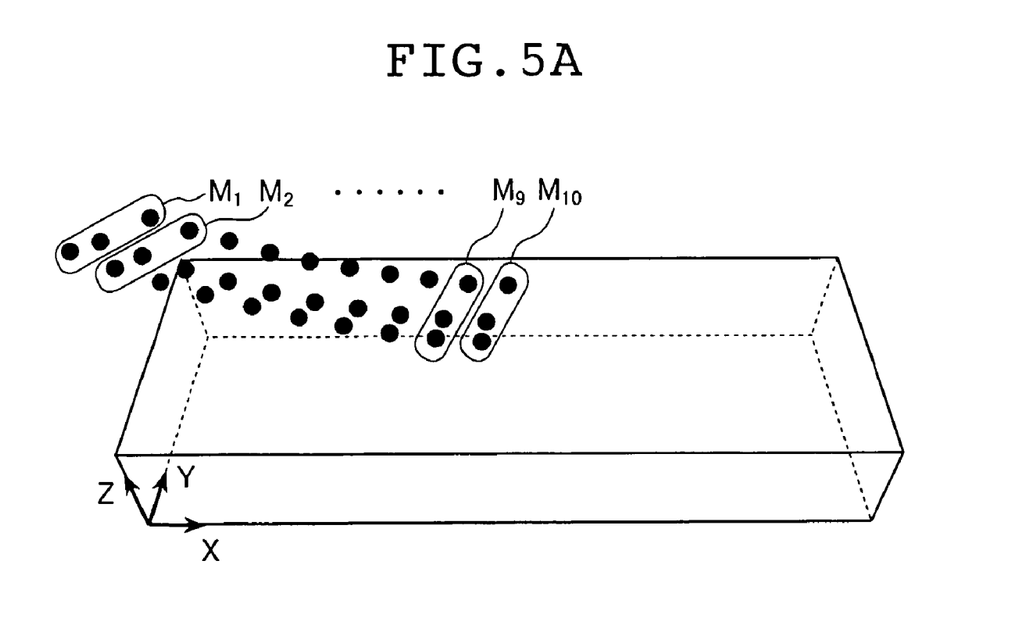
FIG. 5A is a diagram that indicates the behavior of images of reflection markers obtained in the moving body measuring apparatus of the present invention.

The head speed of the golf club head is normally from 30 to 50 m/s. The golf club head thus moves from 3 to 5 cm in 0.001 sec. Plot groups $M_1$ to $M_{10}$ in FIG. 5A, which indicate the three retroreflection markers, show positions of the three retroreflection markers photographed at time intervals of 0.001 seconds. Changes in the position of the golf club head and the orientation of its face portion can thus be known according to the positions of the retroreflection markers.

The analysis portion 20 computes the position and the orientation of the golf club as time series data from the three dimensional position coordinates found by the marker position extraction portion 18.

Specifically, information relating to positions of points on a three dimensional geometric model that correspond to the positions at which the retroreflection markers are disposed on the golf club head are stored in advance in a memory or the like. The analysis portion 20 calls out the data and the information and computes time series data for the position and the orientation of the golf club head.

In addition, the analysis portion 20 identifies an impact position for the golf ball on the impact surface of the golf club head by using the computed time series data on the position and orientation of the golf club head, and performs at least one of computing the head speed at the impact position and computing the effective loft angle for the golf club head.

Figure 5B:
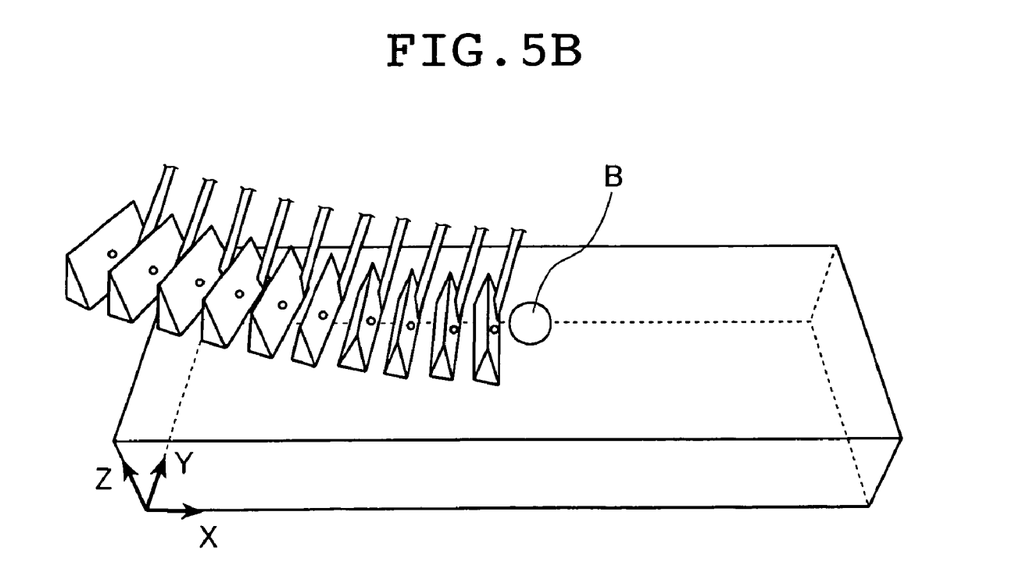
FIG. 5B is a diagram that indicates the behavior of a golf club head obtained by the moving body measuring apparatus of the present invention.

As FIG. 5B shows, the position and the orientation of a three dimensional geometric model B corresponding to a golf ball immediately prior to being struck can be found, and the impact position of the golf ball on the impact surface of the golf club head can be identified to a precision within ±0.5 mm, for example. Further, the head speed at the impact position can be computed, and changes in the head speed can be computed at a precision within ±0.5 m/sec, for example. In addition, the effective loft angle of the golf club head can be computed at a precision within ±0.5°, for example.

The golf club head moves over a roughly circular trajectory during the golf swing, and centrifugal force acts on the center of mass of the golf club head at this point. On the other hand, although the golf club head is supported by a golf shaft, the position at which the golf shaft supports the golf club head and the position of the center of mass of the golf club head do not coincide with each other. Accordingly, a moment acts on the golf club head due to the centrifugal force acting on the center of mass of the golf club head. The term effective loft angle of the golf club head means the loft angle at the time when the orientation of the impact surface of the golf club head changes due to this moment. In addition to the effective loft angle, the orientation of the impact surface in the lateral direction such as whether the impact surface is open or closed immediately prior to striking the golf ball, can of course also be found.

The output portion 22 instructs an external device such as a printer 24 to output computation results such as the impact position of the golf ball, the head speed, or the effect loft angle computed. When necessary, the output portion 22 analyzes characteristics of the golf swing of a golfer from the computed time series data for the computed position and orientation of the three dimensional geometric model, recommends a golf club suited to the golf swing based on the analysis results, and outputs the recommendation to an external device such as the printer 24.

The characteristics of the golf swing are analyzed as follows. For example, by analyzing the trajectory of the golf club head when the golfer takes a golf swing, the golf swing can be classified as a level swing, an upswing, or a downswing, and in addition, the trajectory of the golf club head during the swing can be classified as being from outside to inside, from inside to outside, from inside to inside, or the like. In addition, the golf swing can be classified as one with which the impact surface of the golf club head immediately prior to striking the golf ball is open or closed. The characteristics of the golf swing can be analyzed through one of the above classifications or through a combination of the above classifications.

With respect to the analyzed golf swing characteristics, a golf club having a golf club head whose impact surface orientation and center of mass position are adjusted so that a straight golf ball flight is achieved is recommended by product name or model.

Further, the initial ballistics (initial velocity, spin rate, initial moving angle) of the golf ball immediately after the golf ball is struck may also be measured separately from the golf club head behavior measurements. The golf swing may then be analyzed using the measurement results to recommend a golf club.

A CPU manages and controls each function of the computer system 14. The memory stores the computation results computed by each portion of the computer system 14, golf club information in the form of a table of product names and models of golf clubs prepared by using the characteristics of the golf swing used for classification, and the like.

The monitor 26 displays images photographed by the irradiation and photographing portions 30a and 30b, signal processed images, the time history of the movement of the retroreflection markers, an input screen for setting image processing conditions, and the results found by each portion of the computer system 14.

The operation portion 28 is a mouse or a keyboard. The operation portion 28 is used to input various settings, such as setting the image processing conditions and setting the display screen displayed in the monitor 26.

With the head measuring apparatus 10, the retroreflection markers shown in FIGS. 2A and 2B are first provided on the surface of the golf club head in three or more locations.

The golf club head is set in a predetermined address state, and the camera 36 photographs still images of the golf club head in this state. Information relating to the arrangement positions at which the three retroreflection markers are provided on the golf club head is accurately found by the retroreflection marker position extracting portion 18 of the computer system 14. The arrangement position information is stored in the memory. The arrangement position information is information on the three dimensional coordinates of the center of mass position of the golf club head, for example, taken as an origin.

It should be noted that the arrangement position information relating to the three retroreflection markers on the golf club head may also be acquired more accurately by using a separate device instead of the head measuring apparatus 10, such as a three dimensional geometry measuring instrument that employs laser light. The information may then be stored in advance in the memory of the computer system 14.

The golfer next grips the golf club on which the retroreflection markers are provided and takes a golf swing. The golf club head prior to and after the golf ball B is struck during the golf swing is photographed by the irradiation and photographing portions 30a and 30b.

Images photographed by the irradiation and photographing portions 30a and 30b undergo predetermined image processing, and are then supplied to the signal processing portion 16 as digital image data.

In the signal processing portion 16, the positions of the retroreflection markers 50 are extracted based on the image data of the golf club head during the golf club swing as three dimensional coordinates in an xyz coordinate system.

At least one of identifying the impact position of the golf ball on the impact surface of the golf club head, computing the head speed at the impact position, and computing the effective loft angle of the golf club head from the computed time series data is performed according to an instruction from an operator.

Finally, when necessary, the characteristics of the golf swing of the golfer are analyzed from the computed time series data, and a golf club suited to the golf swing is recommended based on the analysis results.

It should be noted that functions other than those described above may also be added to the computer system 14.

The extremely important information, that is, the position and orientation of the impact surface of the golf club head immediately prior to striking the golf ball, and in addition, the movement velocity of the impact surface, can thus be found by the head measuring apparatus 10, where it is unnecessary to provide a retroreflection marker on the impact surface as with conventional measuring apparatuses. Further, changes in the head speed, and changes in the rotational velocity that causes the orientation of the golf club head to change can also be found.

Further, it is not necessary to provide the retroreflection markers on the impact surface. The retroreflection markers can be provided on the upper end surface and the side surfaces that contact the impact surface of the golf club head, and can be provided on the hosel portion. Consequently, it is not necessary to dispose the camera and the irradiation light source on the side where the golf ball is struck to fly.

In the embodiments of the present invention, an optical path for light from the irradiation light source irradiated to the retroreflection markers provided on the moving body overlaps an optical path for light reflected by the retroreflection markers provided on the moving body. The optical path of the irradiation light is thus not limited in order to ensure a field of view for photography as it is with conventional apparatuses.

The center region of the field of view can be illuminated, and the retroreflection markers can be brightly photographed. Boundaries between the retroreflection marker portions and the non-retroreflection marker portions thus become clear within the images photographed. Accordingly, erroneous detection of the retroreflection marker portions decreases, and it becomes easy for the signal processing portion 16 to perform binarization of the image. In addition, the computer system 14 and the image processing performed within the computer system 14 can be simplified.

Further, the amount of light received by the image photographed by the camera 36 increases compared to that found in conventional methods. Accordingly, it becomes possible to further increase the shutter speed, or to further shorten the time intervals at which light is emitted intermittently by the irradiation light sources, when making multiple exposures. The precision at which the retroreflection marker positions are extracted by the marker position extraction portion 18 therefore increases, and computation of the movement information for the moving body can be performed with a very high precision.

It should be noted that, for cases in which the motion of the moving body object to be measured is limited to a one dimensional coordinate system or a two dimensional coordinate system, one irradiation and photographing portion 30 can be used in the moving body measuring apparatus, and the number of the retroreflection markers provided on the moving body can be set to one or two. The types of movement information for the moving body computed by the computer system 14 can of course be freely changed in this case.

It should be noted that the irradiation and photographing portions 30a and 30b each photograph images made by reflected light when the retroreflection markers are irradiated with light from one direction. However, with the present invention, light is made to branch by using the half mirror, and in addition, light is irradiated from another direction by using the total reflection mirror. Images of the retroreflection markers made by light reflected from two directions according to this type of irradiation may thus be photographed by the camera 36 as one image.

Figure 6A:
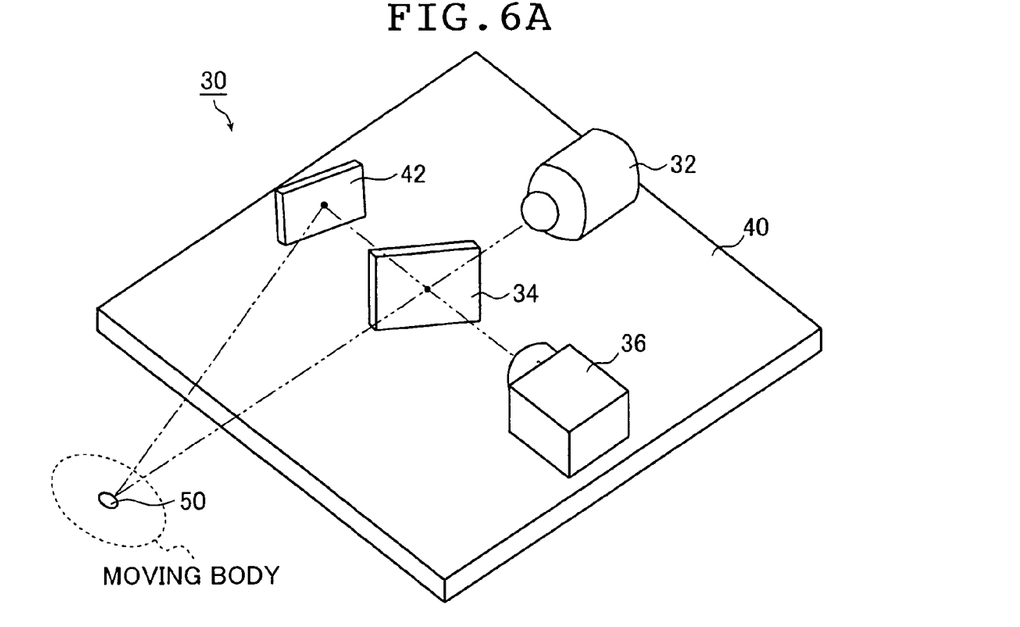
FIG. 6A is a diagram that shows another embodiment of an irradiation and photographing portion of a head measuring apparatus, which is an example of a moving body measuring apparatus of the present invention.
Figure 6B:
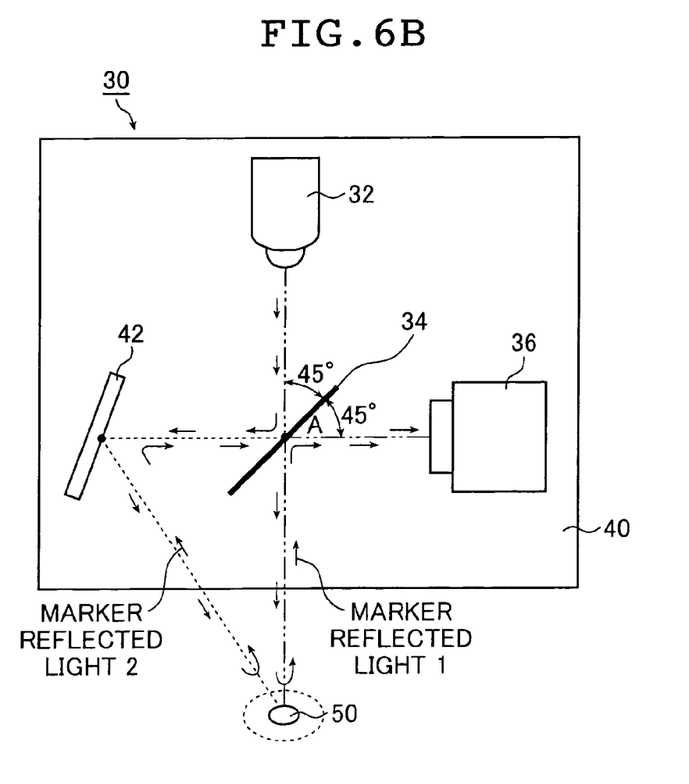
FIG. 6B is a diagram that explains an optical path formed by the irradiation and photographing portion of FIG. 6A.

FIG. 6A is a perspective view that shows a portion of the head measuring apparatus 10 constituting the irradiation and photographing portion 30 that performs stereo photography. FIG. 6B is a perspective view of the irradiation and photographing portion 30.

Referring to FIGS. 6A and 6B, the irradiation and photographing portion 30 includes the irradiation light source 32 that irradiates a moving body object to be measured, the half mirror 34 that transmits and reflects light incident on a boundary surface thereof, a camera 36, a reflecting mirror 42 having a total reflection surface that totally reflects light and a function for adjusting the reflection direction (angle) and position of the total reflection surface, and the flat plate surface 40 to which each of the components described above is attached.

The irradiation light source 32, the half mirror 34, and the camera 36 are provided similar to those of the irradiation and photographing portions 30a and 30b shown in FIG. 3.

The reflecting mirror 42 is provided, and the orientation of the total reflection surface thereof may be adjusted, so that light emitted by the irradiation light source 32 and reflected by the half mirror 34 is reflected by the reflecting mirror 42 and irradiated to the retroreflection markers 50 of the moving body, and in addition, so that light reflected from the retroreflection markers 50 enters the camera 36 through the reflecting mirror 42 and the half mirror 34.

Referring to FIG. 6B, the irradiation light source 32 of the irradiation and photographing portion 30 emits continuous light toward the boundary surface of the half mirror 34. The emitted light is transmitted through the half mirror 34, and transmitted light that transmits through a position A on the boundary surface of the half mirror 34 outgoes. As explained above with reference to FIGS. 3A and 3B, the transmitted light thus outgoing is irradiated to the retroreflection markers 50 provided on the moving body (golf club head) that is the object to be measured. The reflected light from the retroreflection markers (hereinafter referred to as marker reflected light 1) is directed toward the boundary surface of the half mirror 34. Similar to the embodiment shown in FIGS. 3A and 3B, the marker reflected light 1 advances in a direction opposite to that of the irradiation light, and the optical path of the marker reflected light coincides with the optical path of the irradiation light. Accordingly, a reflecting angle formed between the light irradiated to the retroreflection markers 50 from the boundary surface of the half mirror 34 and the boundary surface of the half mirror 34 substantially coincides with an incoming angle formed by the marker reflected light 1 entering the boundary surface of the half mirror 34. The reflected light entering the half mirror 34 is reflected and directed toward the camera 36, and enters the light receiving portion, such as a lens, of the camera 36.

On the other hand, referring to FIG. 6B, the light reflected by the half mirror 34 from among the light outgoing from the irradiation and photographing portion 30 becomes incident upon the total reflection surface of the reflecting mirror 42. The totally reflected light is irradiated here as irradiation light to the retroreflection markers 50 provided to the moving body (golf club head) that is an object to be measured.

The reflected light from the retroreflection markers 50 at this point (hereinafter referred to as marker reflected light 2) is totally reflected by the reflecting mirror 42 and overlaps with the optical path of the irradiation light that irradiates the retroreflection markers 50, and is directed toward the total reflection surface of the reflection mirror 42. The marker reflected light 2 is reflected by the total reflection surface of the reflecting mirror 42 toward the half mirror 34. A light reflecting angle (outgoing angle) at which the light outgoes from the half mirror 34 toward the reflection mirror 42 is substantially identical to an incoming angle at which the marker reflected light 2 enters the half mirror 34.

In addition, the marker reflected light 2 that is transmitted through the half mirror 34 enters the light receiving portion, such as a lens, of the camera 36 along with the marker reflected light 1 that is reflected by the half mirror 34.

An image of the retroreflection markers formed by two reflected light beams from the retroreflection markers can thus be photographed by the camera 36 because the optical paths of the irradiation light reflected from two different directions are substantially identical.

In this case the position and orientation of the reflection mirror 42 may be adjusted so that the image formed according to the marker reflected light 2 and the image formed according to the marker reflected light 1 are photographed at different positions.

The image of the retroreflection markers on the moving body can thus be photographed as a stereo image by using one camera. The two images may be incorporated, for example, by dividing the image in half in upper and lower directions.

It should be noted that other optical members can be used as a substitute for the half mirror 34, such as half prisms and various types of beam splitters, provided that each of the optical members has a boundary surface that reflects and transmits bidirectionally incident light. Although there are no particular limitations placed on the ratio of the reflectances here, it is preferable to use an optical member having a substantially one to one ratio.

Further, the reflection mirror can also be configured in the present invention as described below.

Figure 7:
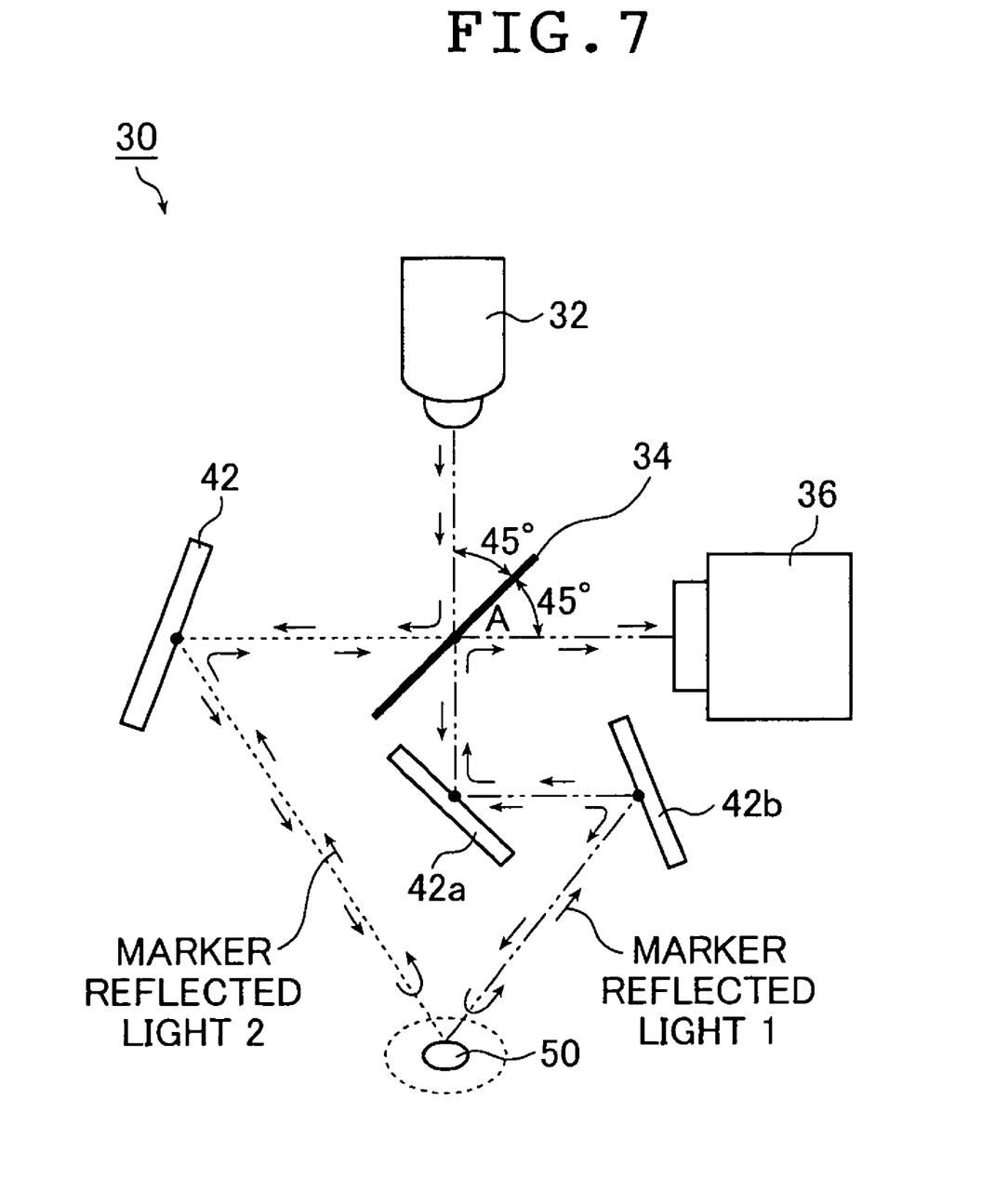
FIG. 7 is a diagram that shows a further another embodiment of an irradiation and photographing portion of a head measuring apparatus, which is an example of a moving body measuring apparatus of the present invention.

FIG. 7 is a perspective view of an embodiment in which reflection mirrors 42a and 42b are disposed in the optical path by the irradiation and photographing portion 30 in addition to the reflection mirror 42, giving the marker reflected light 1 and the marker reflected light 2 substantially the same optical path length.

Referring to FIG. 7, the reflection mirrors 42a and 42b are provided in an optical path of the marker reflected light 1 from the retroreflection markers 50 to the half mirror 34 (optical path along which light transmitted through the half mirror 34 is irradiated to the retroreflection markers 50) in the irradiation and photographing portion 30. The directions and positions of reflective surfaces of the reflection mirrors 42a and 42b are adjusted here so that light from the irradiation light source 32 that is transmitted through the half mirror 34 irradiates the retroreflection markers 50, and so that reflected light in which the marker reflected light 1 is reflected becomes incident on the boundary surface of the half mirror 34.

By providing the reflection mirrors 42a and 42b in the optical path of the marker reflected light 1, the optical path of the marker reflected light 1 from the retroreflection markers 50 to the half mirror 34 can be made longer, becoming substantially the same as the optical path length of the marker reflected light 2. In other words, by providing the configuration shown in FIG. 7, the optical path length of the marker reflected light 1 becomes longer than that shown in FIG. 6B, and the optical path lengths of the marker reflected light 1 and the marker reflected light 2 to the camera 36 can be made substantially the same.

By making the optical path lengths approach the same length, the camera 36 can photograph the two images of the retroreflection markers 50 in focus.

In this case as well, the outgoing angle at which light irradiated from two different directions outgoes from the boundary surface of the half mirror 34 substantially coincides with the incoming angles of reflected light corresponding to when the two reflected light beams (the marker reflected light 1 and the marker reflected light 2) reflected by the retroreflection markers 50 enter the boundary surface of the half mirror 34. Images of the two reflected light beams of the retroreflection markers 50 provided to the moving body can thus be photographed with high contrast.

It should be noted that, when reflection mirrors like those described above are provided in the optical path, it is preferable to provide the reflection mirrors 42a, 42b, and the like in the optical paths of the two reflected light beams from the retroreflection markers 50 to the camera 36 so that the total number of reflections, including the reflections by the half mirror 34, is an odd number for each of the two reflected light beams or even number for each. By making the total number of reflections even or odd for each of the two reflected light beams, both images of the two reflected light beams photographed by the camera 36 can be made into real images or reversed images, and the direction (up and down, left and right, or the like) that the retroreflection markers 50 move within the photographed image can be unified. In this embodiment there are two reflection mirrors, the reflection mirrors 42a and 42b, provided in the optical path of the marker reflected light 1. Accordingly, the marker reflected light 1 is reflected a total of three times, in the order first by the reflection mirror 42b, the reflection mirror 42a, and then the half mirror 34, while the marker reflected light 2 is reflected once by the mirror 42. In other words, the two reflected light beams (the marker reflected light 1 and the marker reflected light 2) are both reflected an odd number of times in the optical path from the retroreflection markers 50 to the camera 36.

The image obtained by the irradiation and photographing portion 30 is transmitted to the computer system 14, which is a motion computation portion, via the controller device 12, similarly to the example shown in FIG. 1. The computer system 14 performs processing and analysis similar to the processing content described above. The computer system 14 computes and outputs movement information for the moving body (golf club head) to be measured.

It should be noted that, although the irradiation and photographing portion 30 as shown in FIGS. 6A and 6b, and in FIG. 7, performs photography of one set of stereo images, the present invention is not in particular so limited. The number of the irradiation and photographing portions 30 provided to the head measuring apparatus 10 may be increased to two, three, or more, and photography of a plurality of sets of stereo images of the golf club head may be performed. Further, the irradiation and photographing portion 30 shown in FIGS. 6A and 6B, and in FIG. 7, that performs stereo photography can be combined with the irradiation and photographing portion 30 shown in FIG. 3 that performs simple photography. Movement information can be measured by photographing the golf club head.

Figure 8A:
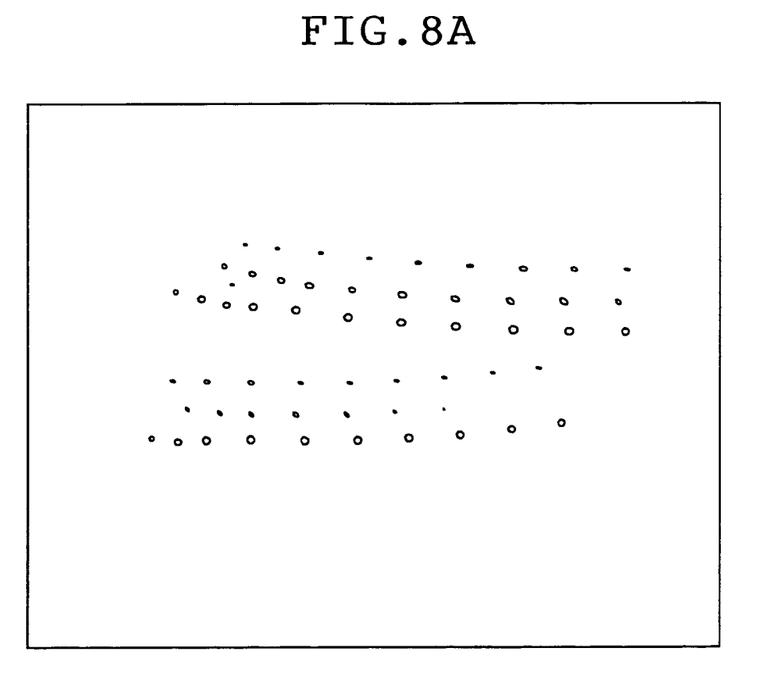
Figure 8B:
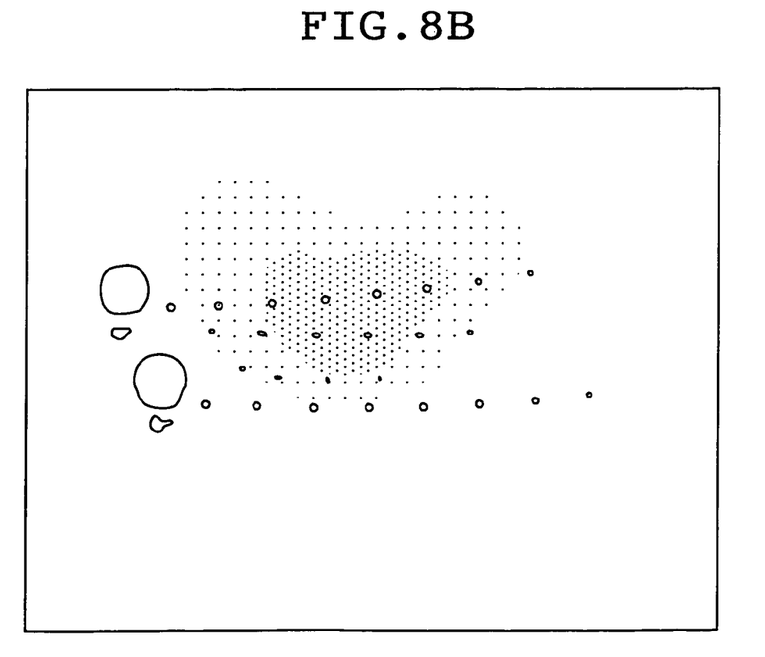

FIGS. 8A and 8B are schematic diagrams of images obtained when the retroreflection markers 50 provided on the golf club head are photographed during a golf swing. FIG. 8A shows a schematic image photographed by using the head measuring apparatus 10 provided with the irradiation and photographing portion 30 shown in FIG. 7 according to one embodiment of the present invention. FIG. 8B shows a schematic image photographed by using a conventional method in which the irradiation light source 32 is set behind the camera 36.

The images shown by FIGS. 8A and 8B were photographed by using a halogen light source as the irradiation light source, with an exposure time interval of 0.001 sec, using a Parniks Corp. camera (currently JAI Corp.).

Three retroreflection markers were provided to the golf club head photographed here as shown in FIG. 2A. The six white points shown in FIGS. 8A and 8B aligned in the vertical direction of the figure are six images obtained by looking at the three retroreflection markers from two different directions. By adjusting the positions and orientations of the reflection mirrors, the images from the two different directions are photographed as divided into two equivalent portions in the upward and downward direction. The white points that indicate the images of the three retroreflection markers here have positions and positional relationships therebetween that change according to the movement of the moving body (gold club head) being measured.

The images shown in FIG. 8A obtained according to an embodiment of the present invention have high contrast in the white points indicating the retroreflection markers compared to the images shown in FIG. 8B photographed by using the conventional photographing method. Images not affected by the influence of camera shadows, noise, and the like other than images due to light reflected by the retroreflection markers are output in the images shown in FIG. 8A obtained by an embodiment of the present invention. A large white color region exists in the center of the images shown in FIG. 8B, but this type of large white color region does not exist in the images shown in FIG. 8A.

Movement information for the moving body can be found from the images thus photographed according to an embodiment of the present invention by performing highly efficient image processing.

It should be noted that, although the moving body explained in this embodiment of the present invention is the golf club head, and the explanation is given here centering on the moving body measuring apparatus for the golf club head on which the retroreflection markers are provided, the present invention is not limited to the example described above. The present invention can also be applied to measuring movement information when the moving body to be measured is a golf ball, a baseball, a tennis ball or the like, or a human being, an animal, a machine, a component part, or the like.

Motion capture in which a human being, for example, is used as the moving body and motion of the human being is measured can be shown as an example of measuring movement information. In this case markers are provided on the surface of the human body (skin, clothing, or the like), and the motions of parts of the human body such as the face, arms, trunk, legs, and joints can be measured, analyzed, stored, and output in detail.

In this case the number of moving objects (number of human beings) taken as the objects to be measured, the number of reflection markers provided on the human body, the number and arrangement positions of irradiation light sources and cameras, the apparatus configuration and processing content of the moving body measuring apparatus, and the like may be suitably set. In consideration of the influence of indoor light or the like during photography, it is preferable to set the emission wavelength of the irradiation light source to include the infrared band equal to or greater than 780 nm, and it is preferable to use cameras, half mirrors, reflection mirrors, and reflection markers that are able to handle this wavelength band of light. In addition, visible light or ultraviolet light may also be used as the light emitted by the irradiation light source depending upon the uses and conditions of measurement and analysis. Irradiation light sources, cameras, half mirrors, reflection mirrors, and reflection markers that are able to handle this wavelength band of light can also be used. Further, the camera type can also be freely selected according to the uses of measurement and analysis, and the objects being measured and analyzed.

Motion capture using the present invention can be applied to medicine (rehabilitation), leisure (video games, movies), sports (analysis of form), remote device control, and the like. When the present invention is applied to sports (analysis of form), reflection markers may be attached to surface locations on the body of the golfer G shown in FIG. 1, or the golfer G may wear clothes, a cap, gloves, and the like on which reflection markers have been provided. When the golfer G grips the golf club C and takes a golf swing, images of light reflected by each of the reflection markers are photographed, and the golf swing form (body behavior) of the golfer G can be analyzed, recorded, output, and the like by the computer system.

The half mirror is thus provided in the present invention so that the irradiation light that irradiates the reflection markers has an optical path that is substantially identical to the optical path of the reflected light from the reflection markers during measurement of a moving body such as a golf club head on which the reflection markers are provided. The camera performs photography. Accordingly, the irradiation light is irradiated with the reflection markers as the center, and the light reflected by the reflection markers is photographed. High contrast photography can thus be performed.

It should be noted that, although the light that is emitted by the irradiation light source 32 is transmitted through the boundary surface of the half mirror 34 and then irradiates the retroreflection markers 50 in the embodiment shown in FIGS. 3A and 3B, the present invention is not in particular limited to this embodiment. For example, an embodiment is also possible in which light that is emitted by the irradiation light source 32 shown in FIGS. 3A and 3B is reflected by the boundary surface of the half mirror 34 and then irradiated to the retroreflection markers 50. The camera 36 may then photograph an image of light that transmits through the boundary surface of the half mirror 34 from among the light reflected by the retroreflection markers 50. In this case the light absorbing member 38 is provided in a region through which light emitted by the irradiation light source 32 is transmitted through the half mirror 34. In addition, a reflection mirror may also be provided in the optical path from the irradiation light source 32 to the camera 36.

Further, from among the light emitted by the irradiation light source 32, light that is transmitted through the boundary surface of the half mirror 34 directly irradiates the retroreflection markers 50, and light that is reflected by the boundary surface of the half mirror 34 is additionally reflected by the reflection mirror 42 and then irradiates the retroreflection markers 50 in the irradiation and photographing portion 30 shown in FIGS. 6A and 6B. However, an embodiment is also possible in which, from among the light emitted by the irradiation light source 32, light that is reflected by the boundary surface of the half mirror 34 directly irradiates the retroreflection markers 50, while light that is transmitted through the boundary surface of the half mirror 34 is next reflected by the reflection mirror 42 and then irradiates the retroreflection markers 50. In this case as well, two images according to the light reflected by the retroreflection markers 50, which are irradiated from two directions, are photographed by the camera 36 through the half mirror 34 proceeding in a direction opposite to that of the irradiation light.

The moving body measuring apparatus of the present invention has been explained in detail above. However, the present invention is not limited to the embodiments described above. A variety of improvements and changes may of course be made to the present invention in a scope that does not deviate from the gist of the invention.

What is claimed is:

1. A moving body measuring apparatus that measures movement information of a moving body as an object to be measured, the moving body measuring apparatus comprising:
   an optical member having a boundary surface on which light is incident, the optical member transmitting a part of the light and reflecting a remainder of the light at the boundary surface to emit two irradiation lights in two different directions;
   an irradiation light source that emits light toward the optical member to irradiate the moving body with the irradiation lights from two different directions;
   a camera that photographs via the optical member an image of light reflected from a reflection marker, provided on a surface of the irradiated moving body; and
   a movement information computation portion that computes movement information for the moving body based on the image of the light reflected by the reflection marker and photographed by the camera,
   wherein the reflection marker is a retroreflection marker that reflects the irradiation lights backward to incoming directions of the irradiation lights,
   wherein arrangement of the irradiation light source, the camera, and the optical member is adjusted such that respective outgoing angles at which the irradiation lights outgo from the boundary surface of the optical member in the two different directions substantially coincide with respective incoming angles at which two reflected light beams, obtained by irradiating the moving body with the irradiation lights in the two different directions, enter the boundary surface.

2. The moving body measuring apparatus according to claim 1, further comprising reflecting mirrors disposed in optical paths followed by the two reflected light beams before arriving at the camera such that the number of reflections, including the reflection by the optical member, is an even number or an odd number for each of the two reflected light beams.

3. The moving body measuring apparatus according to claim 1, wherein the camera incorporates images of the two reflected light beams that pass through two different optical paths into one image frame.

4. The moving body measuring apparatus according to claim 1, wherein the camera photographs an image of the moving reflection marker through multiple exposures at fixed intervals of time.

5. The moving body measuring apparatus according to claim 4, wherein the camera performs the multiple exposures at the fixed intervals of time by the irradiation light source emitting light intermittently at the fixed intervals of time during photography by the camera.

6. The moving body measuring apparatus according to claim 4, wherein the camera performs the multiple exposures at the fixed intervals of time by the irradiation light source emitting light continuously during photography by the camera.

7. The moving body measuring apparatus according to claim 1, wherein the camera is a high speed video camera that performs photography at a speed equal to or greater than 120 frames per second.

8. The moving body measuring apparatus according to claim 1, wherein the light source is a halogen lamp, a mercury fluorescent lamp, a xenon fluorescent lamp, or an LED.

9. The moving body measuring apparatus according to claim 1, wherein the optical member reflects the image of light reflected from the reflection marker into the camera.

10. The moving body measuring apparatus according to claim 1, wherein two or more predetermined reflection markers are provided at different positions on the moving body, each of the predetermined reflection markers being used as the reflection marker, and wherein the movement information computation portion identifies the positions of the predetermined reflection markers from an image of the moving body during moving photographed by the camera, and computes time series data for a position and an orientation of the moving body as the movement information based on the positions of the predetermined reflection markers.

* * * * *